(12) United States Patent
Mori

(10) Patent No.: US 9,333,927 B2
(45) Date of Patent: May 10, 2016

(54) VEHICLE WITH LUMINOUS DISPLAY INSTRUMENT

(71) Applicant: GM GLOBAL TECHNOLOGY OPERATIONS LLC, Detroit, MI (US)

(72) Inventor: Erol Mori, Frankfurt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/493,180

(22) Filed: Sep. 22, 2014

(65) Prior Publication Data
US 2015/0084756 A1   Mar. 26, 2015

(30) Foreign Application Priority Data

Sep. 21, 2013 (DE) .......................... 10 2013 015 745

(51) Int. Cl.
| | |
|---|---|
| *B60R 13/02* | (2006.01) |
| *B60Q 3/02* | (2006.01) |
| *B60Q 9/00* | (2006.01) |
| *G08G 1/16* | (2006.01) |
| *B60Q 3/04* | (2006.01) |

(52) U.S. Cl.
CPC .......... *B60R 13/0237* (2013.01); *B60Q 3/0203* (2013.01); *B60Q 3/044* (2013.01); *B60Q 9/008* (2013.01); *B60R 13/02* (2013.01); *B60R 13/0243* (2013.01); *G08G 1/167* (2013.01); *B60R 2013/0287* (2013.01)

(58) Field of Classification Search
CPC .......................... B60Q 1/0023; B60R 13/0243
See application file for complete search history.

(56) References Cited

U.S. PATENT DOCUMENTS

| | | | | |
|---|---|---|---|---|
| 5,094,151 | A * | 3/1992 | Bernard ................. | B60H 1/267 160/368.1 |
| 6,160,475 | A * | 12/2000 | Hornung .............. | B60Q 3/0216 307/10.8 |
| 2011/0141760 | A1* | 6/2011 | Ory ...................... | B60Q 3/0216 362/555 |
| 2012/0063154 | A1* | 3/2012 | Cannon .................. | B60Q 3/004 362/490 |
| 2012/0257407 | A1* | 10/2012 | Demma .................. | B60R 13/04 362/602 |
| 2014/0091915 | A1* | 4/2014 | Rodriguez .............. | B60R 1/082 340/435 |

FOREIGN PATENT DOCUMENTS

| | | |
|---|---|---|
| DE | 102006013937 A1 | 9/2007 |
| DE | 102007032527 A1 | 2/2008 |
| DE | 102007061723 A1 | 6/2009 |
| DE | 102009030684 A1 | 12/2010 |
| DE | 102012210750 A1 | 4/2014 |

* cited by examiner

*Primary Examiner* — Van Trieu
(74) *Attorney, Agent, or Firm* — Ingrassa Fisher & Lorenz PC

(57) ABSTRACT

A vehicle has a support structure, on which at least one wall element bounding a passenger cell and a luminous display instrument covered by the wall element are fastened. A light source of the luminous display instrument is positioned in order to shine through a light permeable region of the wall element on a part of its extent.

14 Claims, 2 Drawing Sheets

VEHICLE WITH LUMINOUS DISPLAY INSTRUMENT

CROSS REFERENCE TO RELATED APPLICATION

This application claims priority to German Patent Application No. 102013015745.5 filed Sep. 21, 2013, which is incorporated herein by reference in its entirety.

TECHNICAL FIELD

The technical field relates to a vehicle and in particular the attachment of a luminous display instrument in the vehicle, with which the driver can be informed regarding operating states of the vehicle or have his attention drawn to certain events in the vehicle or in the surroundings of the vehicle.

BACKGROUND

A luminous display instrument conventionally includes a light source which, in order to function, has to be connected to the vehicle battery. A printed circuit board, on which the light source is mounted, is to be generally invisible to the vehicle occupants and is therefore separated from the passenger cell by a trim element. The trim element includes a window, which is necessary in order to allow the light of the light source through, but is otherwise light impermeable. On the one hand, the window should be relative small so that the light source is visible in it at most when it is switched on. However, the smaller the window, the more exact it has to be positioned relative to the light source so that it is caught by the light of the light source. When trim element and luminous display instrument are fastened on a same support structure of the vehicle independently of one another, the contacting of the luminous display instrument is simple, since it can take place before the attachment of the trim element. However, tolerances in the positioning can result in that the light of the light source does not exactly catch the window and is therefore hard to see. More exact positioning is possible when the luminous display instrument is first fastened to the trim element and the trim element to the support structure thereafter, but the trim element then interferes with the contacting since the dimensions as a rule are larger than those of the luminous display instrument or the printed circuit board carrying it.

There is therefore a need for a design which can be mounted quickly and efficiently and in the process ensures both simple contacting of the luminous display instrument and also good visibility.

SUMMARY

According to a configuration of the present disclosure, a vehicle with a support structure is disposed and includes at least one wall element fastened to the support structure and bounding a passenger cell and a luminous display instrument fastened on the support structure and covered by the wall element. A light source of the luminous display instrument is positioned with the support structure in order to shine through a first light permeable region of the wall element on a part of its extent. Since the luminous display instrument is fastened to the support structure independently of the wall element, it can be attached and contacted there before the wall element is mounted. Since the light source shines through the light permeable region only on a part of its extent, the position of the wall element relative to the light source can vary without this having an influence on its visibility.

The material of the wall element should be tinted in the light permeable region as in a surrounding region so that the regions, viewed from the passenger cell, are preferably indistinguishable or distinguishable only with difficulty.

The first light permeable region can have a smaller wall thickness than a surrounding region of the wall element that is formed in one piece with the former. Accordingly, both regions can be produced from a same visually homogeneous material, the distinct wall thickness ensuring a reduced light permeability in the surrounding region.

In particular when the light source emits only in a small part of the visible spectrum, can the light permeable region outside this part of the spectrum be rendered opaque. Such opacity creates an intense tinting without absorbing light of the light source.

As such a narrow-band light source, a color LED is possible in particular, the emission wave length of which is predetermined in a manner known per se through the band gap of the semiconductor materials used in it.

In order to increase the information value of the luminous display instrument for the driver, at least one second light source can be provided which emits into a second range of the spectrum and which is positioned in order to shine through a second region which is light permeable in this second range of the spectrum.

This second light permeable region can be provided on a second wall element. Accordingly, at least one of the wall elements can be produced in one piece from the same visually homogeneous material.

The simplification of the assembly that is achievable with the structure described above manifests itself in particular in the case of individual display instruments which are mounted set off from the instrument panel. In particular, such a display instrument can be mounted on a door of the vehicle. In this case, the support structure can be the frame of the door and the at least one wall element be an element of an interior trim of the door.

A wall element, which at least partially covers an A-pillar of the frame of the door is clearly visible for the driver and because of this well suited for the attachment of a display instrument.

In particular, such a wall element can fill out a gusset that is bounded by a belt line of the vehicle and a front edge of a door window.

Alternatively, the wall element can also extend on the door under a belt line of the vehicle.

In the case of such a wall element, which generally includes a substantially vertical wall face and a shoulder connecting the wall face to a window lower edge, the light permeable region should form at least one part of the shoulder that is clearly visible to the driver.

The luminous display instrument can be coupled in particular to a sensor for monitoring a lateral surrounding region of the vehicle in order to indicate the presence of an object, in particular of a second vehicle, in this surrounding region.

When the door carries an outside mirror in a conventional manner, the surrounding region monitored by the sensor should include in particular a blind spot that is not easily visible to the driver via this outside mirror.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
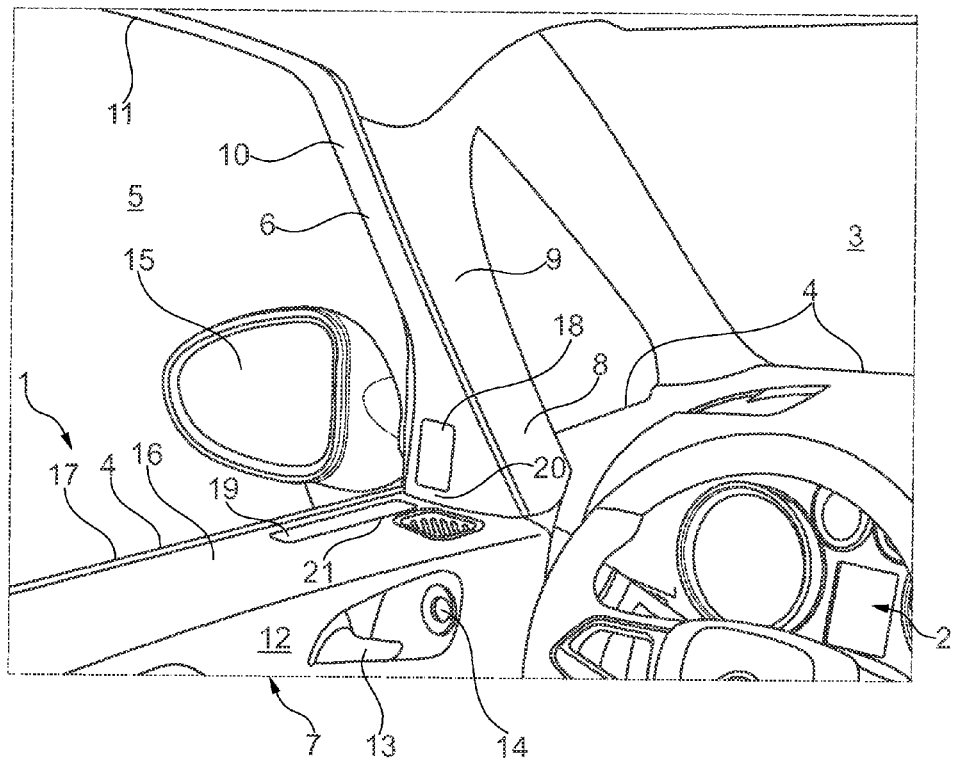
FIG. 1 shows an interior view of a vehicle according to the present disclosure.

FIG. 1 shows an interior view of a vehicle according to the present disclosure from the perspective of its driver. Visible in each case are parts of a door 1 of the vehicle, of an instrument panel 2 and of a windshield 3. A belt line 4 of the vehicle body forms the lower edges of the windshield 3 running at approximately the same height and a window 5 of the door 1. As is usual in this field, the door 1 has a metal support structure, which from the view of the driver is concealed by wall elements, in this case trim elements 6, 7 of an interior trim of the door 1 such as for example a window frame trim and a door interior trim. The trim elements 6, 7 are fastened to the door structure in a concealed manner. Typically these are molded from plastic.

The trim element 6 adjoins a front edge of the window 5 and covers an A-pillar of the support structure. An approximately triangular base portion 8 aid of the trim element 6 fills out a gusset 34 of the door 1 between the front edge of the window 5 and a body-fixed pillar 9 enclosing the door 1. An extension portion 10, which in this case extends as far as to an upper edge 11 of the window 5 and along the latter towards the back can unitarily follow the base portion 8.

The trim element 7 covers the door 1 below the belt line 4. It includes a vertical wall face 12 which in the figure is only shown in a small part, on which a door unlocking lever 13 and an adjusting lever 14 for aligning a rear view mirror 15 that is pivotably mounted to the door 1 on the outside can be attached, and a shoulder 16 which towards the vehicle interior is slightly sloping downwards, which connects the vertical wall face 12 to the lower edge 17 of the window 5.

Reference numbers 18 and 19 respectively designate light permeable regions of the trim elements 6 and 7 respectively, behind each of which the luminous display instrument can be provided. The boundary line between the regions 18, 19 drawn in FIG. 1 and the regions 20, 21 of the trim element 6, 7 surrounding it and unitarily formed with these is not visible in practice; the light permeable regions 18, 19 do not differ in tinting and surface finish from the surrounding regions 20, 21, so that it is not evident from the passenger cell or only through specific examination where the boundaries of the regions 18, 19 run and if a luminous display instrument is present behind the region 18 or 19. This makes possible using the trim elements 6, 7 both for vehicles which are equipped with such luminous display instruments and also for vehicles which do not have these instruments.

Figure 2:
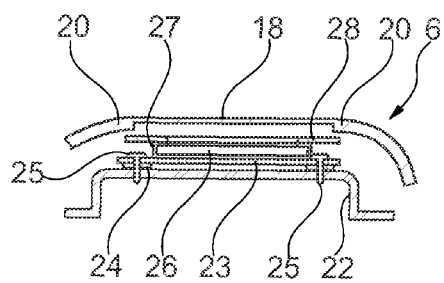
FIG. 2 shows a detail of the vehicle in cross-section.

FIG. 2 shows a partial cross section through the A-pillar of the door 1 according to a first configuration of the present disclosure. On a metal profile, which forms a part of the abovementioned support structure 22 of the door 1, a printed circuit board 23 with an LCD display 24 is mounted. The trim element 6 extends in front of the LCD display 24. It is fastened to the support structure 22 outside the portion shown in FIG. 2 independently of the printed circuit board 23 and later than that. Because of this, it was possible to fasten the printed circuit board 23 to the support structure 22 without being obstructed by the trim element 6, in this case for example through engagement pins 25, and wired.

The trim element 6 includes a transparent grey tinted plastic material. The light permeable region 18 is characterized by a smaller wall thickness and a correspondingly smaller optical density than the area 20 surrounding it. The dimensions of the light permeable region 18 are greater than those of a back lit screen 26 of the LCD display 24, in order for the screen to be completely located behind the light permeable region 18 despite any tolerances of the positioning of trim element 6 and LCD display 24 relative to one another. A black vignette 28 can be attached to a frame 27 of the LCD display 24 surrounding the screen 26 and extend as far as to behind the surrounding region 20 in order to ensure that the boundary between the regions 18, 20, the frame of the LCD display 24 and the printed circuit board 23 do not become visible in the light permeable region 18 even with light incidence from outside. Since the screen 26 of the LCD display 24 in the switched-off state is likewise black and reflects incidental light from the outside to a minor degree at best, the presence of the LCD display 24 from the outside is not detectable as a rule, for as long as it is not itself illuminated, and when a luminous symbol is displayed on the screen 26 in front of a dark background the symbol is visible to the driver through the light permeable region 18, but the edges of the screen 26 or of the light permeable region 18 are not noticeable.

It is to be understood that the screen 26 or a second screen analogous to the above description can also be provided below the region 19 of the shoulder 16.

Figure 3:
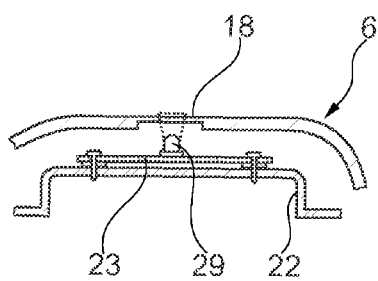
FIG. 3 shows an alternative configuration of the detail from FIG. 2.

FIG. 3 shows a section analogous to FIG. 2 according to an alternative configuration. Here, the polychrome LCD display 24 is replaced with one or multiple monochromatic, e.g. green or red, LEDs 29. The LEDs 29 emit a greatly concentrated light cone. Here, too, the trim element 6 is mounted over the support structure 22 and the printed circuit board 23 in such a manner that the light of the LED 29 illuminates a thin-walled region 18 of the trim element 6 over a part of its extent.

The light, which is generated in an LED through charge carrier recombination, is typically limited to a spectral range of approximately 50 nm width. A typical spectrum of such an LED is schematically shown as a curve E in FIG. 4. Outside the emission range of the LED 29, the material of the trim element 6 can have 100% absorption, as is represented by the curve A from FIG. 4, without this weakening the transmission of the light of the LED 29 through the trim element 6. Accordingly, even when the trim element 6 is directly exposed to the sunlight, only a small component of the sunlight passes through the trim element 6 because of the great absorption in large parts of the visible spectrum, so that it is reflected on the printed circuit board 23, rendering it visible. The amount of the reflected light can, if desired, be further limited through a black coloration of the printed circuit board 23.

Figures 4, 5:
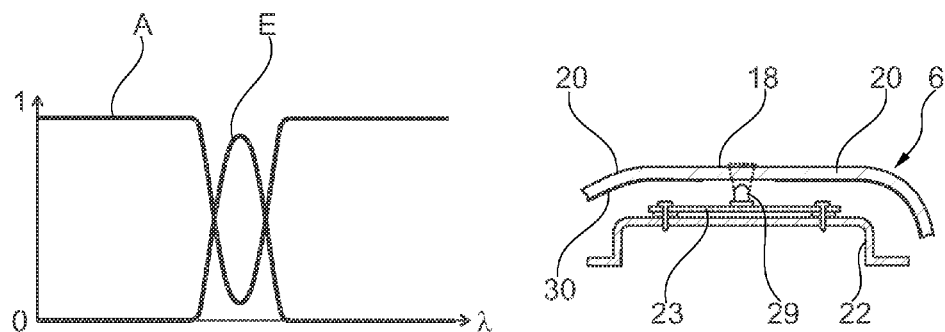
FIG. 4 shows an exemplary emission characteristic of the LED from FIG. 3 and the transmission characteristic of a material of the wall element selected to suit the LED.
FIG. 5 shows a further alternative configuration of the detail from FIG. 2.

Since the absorption of the trim element 6 for the light of the LED 29 is low, it is not necessary to provide a region with reduced wall thickness in front of the LED 29. The wall thickness can be identical throughout the entire extent of the trim element 6. In order to reduce the light quantity, which can penetrate from the outside as far as to the printed circuit board 23 and render switching elements arranged thereon visible, it can however be practical, as shown in FIG. 5, that a black coating 30 is attached to the inside of the trim element 6 outside a light permeable region 18, the dimensions of which are selected so that taking into account all possible positioning tolerances between trim element 6 and printed circuit board 23 the light of the LED 29 completely traverses this region 18.

Figure 6:
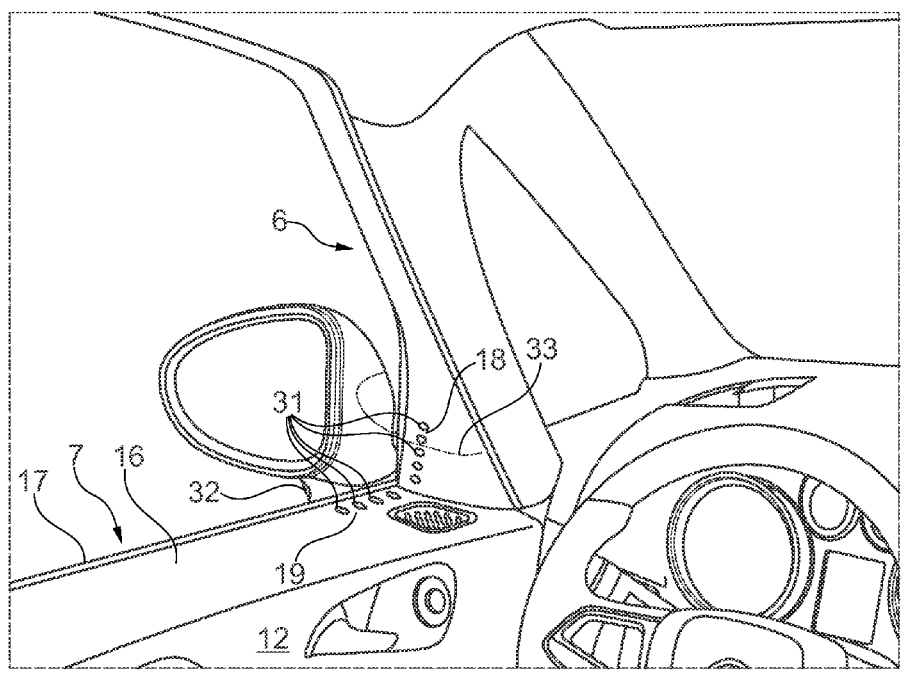
FIG. 6 shows an interior view of the vehicle according to a further configuration.

FIG. 6 shows a view of the vehicle interior that is analogous to FIG. 1 according to a configuration of the present disclosure, in which printed circuit boards 23 (not visible in the figure) with LEDs 29 arranged in a row thereon are attached behind both trim elements 6, 7, so that they are able to illuminate their surfaces in each case at points 31 of their light permeable regions 18, 19. The LEDs 29 serve for displaying the detection results of a blind spot monitoring device, for example a camera 32, which is accommodated in the shaft of the rearview mirror 15. When the camera 32 detects a vehicle in the blind spot, it selects one of the LEDs 29 in each case corresponding to the position of the vehicle, in the case of a large vehicle such as for example a bus or utility vehicle, possibly multiple LEDs which are arranged next to one another, in order to switch these on and thus illustrate to the driver on the one hand the presence of the vehicle in the blind spot, and on the other hand also the position of the vehicle with the help of the position of the respective illuminated LEDs 29. When the vehicle is being overtaken, the LEDs 29 under the trim element 7 are thus switched on one after the other in each case first and from the back to the front and subsequently the LEDs behind the trim element 6 switched on from the bottom up. When the uppermost of the LEDs on the trim element 6 is illuminated, the overtaking process has been largely concluded, the overtaking vehicle is in front of the vehicle of the driver, outside the blind spot, and it is clearly visible to the driver, so that there is hardly any danger posed by this vehicle during a lane change any longer.

In order to distinguish between vehicles in the blind spot and vehicles which are located next to the vehicle of the driver, but which are visible to the driver either directly or via the rearview mirror, LEDs 29 can be installed in different colors, in particular red ones, which signify a major hazard through the overtaking vehicle at the start of an overtaking operation and green, which are activated towards the end of the overtaking, when the overtaking vehicle should already be visible to the driver directly and without any additional resources. Such a spatially-resolved representation allows the driver to recognize if the warning of the monitoring system regarding a second vehicle travelling next to his own vehicle relates to the same vehicle that has just overtaken him and which he can now see next to him, or if at the same time there is actually a second vehicle present in his blind spot.

It can be provided that red LEDs 29 are only mounted under the shoulder 16 and the trim element 6 is so intensively guide through read at the same time that in the view from the outside it appears black and that green LEDs are attached behind the trim element 6 which accordingly is tinted intensely green. However it is also conceivable to divide the base portion 8 of the trim element 6 into a red tinted lower and a green tinted upper region, when only few last LEDs are to be green or unitarily extend the red tinted trim element 7 into the door gusset up to a dashed line 33, and to have the green tinted trim element 7 start only above this line 33.

The matrix display 24 or LED 29 can be employed in order to display any information. In principle, any conventional display provided on the instrument panel can also be placed on the door. For example, coupling to a navigation system can be provided in order to for example indicate a turn-off or lane change instructions of the navigation system on that door 1, towards which turning off or lane changing is required.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A vehicle with a support structure comprising:
   at least one wall element fastened to the support structure and delimiting a passenger cell;
   a luminous display instrument fastened to the support structure and having a light source; and
   a wall element covering the luminous display instrument and having a first light permeable region;
   wherein the light source is located a position to shine through the first light permeable region on a part of its extent; and
   wherein the first light permeable region includes dimensions greater than luminous display instrument, rendering the luminous display instrument unvignetted by the wall element.

2. The vehicle according to claim 1, wherein the wall element comprises a surrounding region surrounding the first light permeable region, wherein the opaque region and the first light permeable region are substantially identically tinted.

3. The vehicle according to claim 2 wherein the first light permeable region has a smaller wall thickness than the surrounding region of the wall element unitarily formed therewith.

4. The vehicle according to claim 1, wherein the light source emits in a first range of the visible light spectrum and the light permeable region of the wall element absorbs the visible light spectrum outside the first range more intensely than the visible light spectrum within the first range.

5. The vehicle according to c air wherein the light source comprises an LED.

6. The vehicle according to claim 4, wherein the luminous display instrument comprises at least one second light source which emits in a second range of the visible light spectrum and is positioned in order to shine through a second region which is light permeable in this second range of the spectrum.

7. The vehicle according to claim 6, wherein the second region is provided on a second wall element.

8. The vehicle according to claim 1, wherein the support structure comprises a frame of a door, and wherein the at least one wall element comprise an interior trim part of the door.

9. The vehicle according to claim 8, wherein the wall element at least partially covers an A-pillar of the frame of the door.

10. The vehicle according to claim 8, wherein the wall element fills out a gusset which is bounded by a belt line and a front edge of a door window.

11. The vehicle according to claim 8, wherein the wall element extends below a belt line of the vehicle.

12. The vehicle according to claim 11, wherein the wall element comprises a substantially vertical wall face and a shoulder connecting the wall face to a window lower edge, wherein the light permeable region forms at least one part of the shoulder.

13. The vehicle according to 1, wherein further comprises a sensor coupled to the luminous display instrument and configured to monitor a lateral surrounding region of the vehicle for detecting the presence of an object in the surrounding region.

14. The vehicle according to claim 13 further comprising an outside mirror carried on a door having a frame with the at least one wall element including an interior trim part of the door, wherein the surrounding region monitored by the sensor includes a blind spot which is not visible via the outside mirror.

* * * * *